United States Patent
Yu et al.

(10) Patent No.: US 10,909,355 B2
(45) Date of Patent: *Feb. 2, 2021

(54) SYSTEMS AND METHODS FOR EFFICIENT FACE RECOGNITION

(71) Applicant: Tinoq, Inc., Santa Clara, CA (US)

(72) Inventors: Daxiao Yu, Cupertino, CA (US); Yang Sun, San Jose, CA (US)

(73) Assignee: Tinoq, Inc., San Jose, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/355,683

(22) Filed: Mar. 15, 2019

(65) Prior Publication Data

US 2019/0213396 A1 Jul. 11, 2019

Related U.S. Application Data

(63) Continuation of application No. 15/448,194, filed on Mar. 2, 2017, now Pat. No. 10,339,368.

(Continued)

(51) Int. Cl.
*G06K 9/00* (2006.01)
*G06K 9/68* (2006.01)
(Continued)

(52) U.S. Cl.
CPC ...... *G06K 9/00288* (2013.01); *A63B 24/0062* (2013.01); *G06F 16/00* (2019.01);
(Continued)

(58) Field of Classification Search
None
See application file for complete search history.

(56) References Cited

U.S. PATENT DOCUMENTS

| 6,032,109 A | 2/2000 | Ritmiller, III |
| 6,043,493 A | 3/2000 | Kim et al. |

(Continued)

FOREIGN PATENT DOCUMENTS

| CN | 101027700 A | 1/2005 |
| CN | 101184010 A | 5/2008 |

(Continued)

OTHER PUBLICATIONS

Non-Final Office Action dated Jun. 14, 2017 in related U.S. Appl. No. 15/331,238, filed Oct. 21, 2016 (28 pgs).

(Continued)

*Primary Examiner* — Kim Y Vu
*Assistant Examiner* — Nathan J Bloom
(74) *Attorney, Agent, or Firm* — North Weber and Baugh LLP; Michael North

(57) ABSTRACT

A method for recognizing the face of a user that uses a device in a facility includes receiving a photo of the user and extracting a face image of the user from the photo. The method includes receiving a full candidate face set of all registered users, a first list of registered users that are within the facility, and a second list of registered users that are using other devices in the facility. The method includes generating a reduced candidate face set from the full candidate face set by excluding at least one of (1) candidate faces corresponding to users that are not included in the first list or (2) candidate faces corresponding to users that are included in the second list, from the full candidate face set. The method also includes determining whether the face image corresponds to a candidate face of the reduced candidate face set.

18 Claims, 13 Drawing Sheets

Related U.S. Application Data

(60) Provisional application No. 62/302,677, filed on Mar. 2, 2016, provisional application No. 62/305,504, filed on Mar. 8, 2016, provisional application No. 62/310,524, filed on Mar. 18, 2016, provisional application No. 62/314,993, filed on Mar. 30, 2016.

(51) Int. Cl.
*G06T 7/11* (2017.01)
*G06T 3/40* (2006.01)
*G06F 16/00* (2019.01)
*A63B 24/00* (2006.01)

(52) U.S. Cl.
CPC ..... *G06K 9/00255* (2013.01); *G06K 9/00979* (2013.01); *G06K 9/6807* (2013.01); *G06T 3/40* (2013.01); *G06T 7/11* (2017.01); *A63B 2220/807* (2013.01); *G06T 2207/20132* (2013.01); *G06T 2207/30201* (2013.01)

(56) References Cited

U.S. PATENT DOCUMENTS

| | | | |
|---|---|---|---|
| 7,602,421 B2 | 10/2009 | Hunter et al. | |
| 7,904,052 B2 | 3/2011 | Moriwaki | |
| 8,230,246 B1 | 7/2012 | Sharkey | |
| 8,544,033 B1* | 9/2013 | Acharya | H04H 60/33 725/10 |
| 8,856,541 B1 | 10/2014 | Chaudhury et al. | |
| 8,939,007 B2 | 1/2015 | Uemura et al. | |
| 9,300,925 B1 | 3/2016 | Zhang | |
| 9,336,456 B2 | 5/2016 | DeLean | |
| 9,342,744 B2 | 5/2016 | Asa et al. | |
| 9,691,221 B2 | 6/2017 | Block et al. | |
| 9,830,631 B1* | 11/2017 | Dhua | G06K 9/6807 |
| 9,924,312 B2 | 3/2018 | Kim et al. | |
| 2005/0012818 A1 | 1/2005 | Kiely et al. | |
| 2005/0091338 A1* | 4/2005 | de la Huerga | H04L 63/108 709/217 |
| 2007/0110422 A1 | 5/2007 | Minato et al. | |
| 2007/0117623 A1* | 5/2007 | Nelson | G07F 17/3255 463/29 |
| 2008/0039136 A1 | 2/2008 | Byun | |
| 2008/0234935 A1 | 9/2008 | Wolf et al. | |
| 2009/0043422 A1 | 2/2009 | Lee et al. | |
| 2009/0185723 A1 | 7/2009 | Kurtz et al. | |
| 2010/0203829 A1 | 8/2010 | Granqvist et al. | |
| 2011/0103643 A1 | 5/2011 | Salsman et al. | |
| 2011/0268024 A1 | 11/2011 | Jamp et al. | |
| 2012/0230555 A1* | 9/2012 | Miura | G06K 9/00926 382/124 |
| 2012/0251079 A1 | 10/2012 | Meschter et al. | |
| 2013/0002869 A1 | 1/2013 | Yuasa et al. | |
| 2013/0057894 A1 | 3/2013 | Narushima et al. | |
| 2013/0165297 A1 | 6/2013 | Daly et al. | |
| 2013/0208952 A1* | 8/2013 | Auchinleck | G06K 9/6807 382/115 |
| 2013/0251216 A1 | 9/2013 | Smowton et al. | |
| 2014/0107846 A1 | 4/2014 | Li | |
| 2014/0274031 A1 | 9/2014 | Menendez | |
| 2014/0330408 A1* | 11/2014 | Rolley | A63B 24/0075 700/91 |
| 2015/0006927 A1 | 1/2015 | Ono et al. | |
| 2015/0065301 A1 | 3/2015 | Oteman | |
| 2015/0133823 A1 | 5/2015 | Houmanfar et al. | |
| 2015/0260580 A1 | 9/2015 | Alameh et al. | |
| 2015/0293580 A1 | 10/2015 | Munoz et al. | |
| 2015/0310280 A1 | 10/2015 | Bentley et al. | |
| 2015/0335950 A1 | 11/2015 | Eder | |
| 2015/0363642 A1* | 12/2015 | Irie | G06K 9/6263 382/103 |
| 2016/0012379 A1* | 1/2016 | Iwai | G06Q 10/063114 705/7.15 |
| 2016/0036996 A1 | 2/2016 | Midholt et al. | |
| 2016/0261911 A1* | 9/2016 | Soundararajan | G06K 9/00778 |
| 2016/0358443 A1 | 12/2016 | True | |
| 2017/0078454 A1* | 3/2017 | Berookhim | H04L 67/06 |
| 2017/0140141 A1 | 5/2017 | Yan et al. | |
| 2017/0245101 A1* | 8/2017 | Chandrasekaran | G06Q 20/405 |
| 2017/0323376 A1 | 11/2017 | Glaser et al. | |
| 2017/0347039 A1 | 11/2017 | Baumert et al. | |
| 2018/0050234 A1 | 2/2018 | Kashyap | |
| 2018/0232592 A1 | 8/2018 | Stewart et al. | |
| 2018/0336687 A1 | 11/2018 | Mudretsov et al. | |

FOREIGN PATENT DOCUMENTS

| | | | |
|---|---|---|---|
| CN | 101401426 | A1 | 4/2009 |
| CN | 101636637 | A | 1/2010 |
| CN | 102754436 | A1 | 10/2012 |
| CN | 102804905 | A1 | 11/2012 |
| CN | 103383723 | A1 | 11/2013 |
| CN | 104636751 | A1 | 5/2015 |
| EP | 1998567 | B1 | 3/2008 |

OTHER PUBLICATIONS

Notice of Allowance dated Oct. 20, 2017 in related U.S. Appl. No. 15/331,238, filed Oct. 21, 2016 (24 pgs).
Non-Final Office Action dated Oct. 15, 2018 in related U.S. Appl. No. 15/262,494, filed Sep. 12, 2016 (22 pgs).
Non-Final Office Action Response filed Dec. 6, 2018 in related U.S. Appl. No. 15/262,494, filed Sep. 12, 2016 (10 pgs).
Final Office Action dated Feb. 4, 2019 in related U.S. Appl. No. 15/262,494, filed Sep. 12, 2016 (25 pgs).
Non-Final Office Action dated Jan. 11, 2018 in related U.S. Appl. No. 15/453,703, filed Mar. 8, 2017 (46 pgs).
Non-Final Office Action Response filed Jul. 11, 2018 in related U.S. Appl. No. 15/453,703, filed Mar. 8, 2017 (9 pgs).
Final Office Action dated Aug. 28, 2018 in related U.S. Appl. No. 15/453,703, filed Mar. 8, 2017 (26 pgs).
Final Office Action Response filed Oct. 26, 2018 in related U.S. Appl. No. 15/453,703, filed Mar. 8, 2017 (13 pgs).
Advisory Action dated Nov. 5, 2018 in related U.S. Appl. No. 15/453,703, filed Mar. 8, 2017 (3 pgs).
Non-Final Office Action dated Dec. 20, 2018 in related U.S. Appl. No. 15/453,703, filed Mar. 8, 2017 (41 pgs).
Non-Final Office Action Response filed Mar. 19, 2019 in related U.S. Appl. No. 15/453,703, filed Mar. 8, 2017 (12 pgs).
Non-Final Office Action dated Sep. 21, 2018 in related U.S. Appl. No. 15/475,046, filed Mar. 30, 2017 (11 pgs).
Non-Final Office Action Response filed Oct. 25, 2018 in related U.S. Appl. No. 15/475,046, filed Mar. 30, 2017 (9 pgs).
Notice of Allowance dated Jan. 25, 2019 in related U.S. Appl. No. 15/475,046, filed Mar. 30, 2017 (24 pgs).
Final Office Action dated Jan. 21, 2020, in the U.S. Appl. No. 15/262,494 (21 pgs).
Non-Final Office Action Response filed Jan. 9, 2020 in the U.S. Appl. No. 15/262,494 (11 pgs).
Supplementary Search Report dated Dec. 10, 2019, in the European Application No. EP17 760 773.6 (33 pgs).
Supplementary Search Report dated Dec. 9, 2019, in the European Application No. EP17 764 046.3 (4 pgs).
International Search Report and Written Opinion dated Nov. 21, 2019, in related PCT Application No. PCT/US19/47318 (9 pgs).
Advisory Action dated Apr. 15, 2020, in the related U.S. Appl. No. 15/262,494 (11 pgs).
Supplementary European Search Report dated Mar. 30, 2020, in the European Application No. EP17 760 773.6, (85 pgs).
First Office Action dated Mar. 20, 2020, in the Chinese Application No. 201780023510.2, (8 pgs).
Applicant Initiated Interview Summary dated Mar. 16, 2020, in the related U.S. Appl. No. 15/262,494, (3 pgs).
Applicant Initiated Interview Summary dated Mar. 11, 2020, in the related U.S. Appl. No. 15/262,494, (3 pgs).
Notice of Allowance dated Jan. 29, 2020, in related U.S. Appl. No. 15/453,703, (23 pgs).

(56) References Cited

OTHER PUBLICATIONS

Supplementary European Search Report dated Apr. 28, 2020, in related European Application No. EP17760773.6, (44 pgs).
First Office Action dated Apr. 14, 2020 in related Chinese Patent Application No. 201780022142.X, (25 pgs).
Advisory Action dated Jun. 4, 2019, in U.S. Appl. No. 15/262,494 (9 pgs).
RCE & Response to Final Office Action filed Jun. 24, 2019, in U.S. Appl. No. 15/262,494 (10 pgs).
Final Office Action dated Jun. 17, 2019, in U.S. Appl. No. 15/453,703 (40 pgs).
RCE and Response to Final Office Action, in U.S. Appl. No. 15/453,703 (12 pgs).
Supplementary Search Report dated Sep. 30, 2019, in the European Application No. EP17776709 (62 pgs).
Supplementary Search Report dated Sep. 19, 2019, in the European Application No. EP17764046 (105 pgs).
Non-Final Office Action dated Oct. 9, 2019, in the U.S. Appl. No. 15/262,494 (19 pgs).
Non-Final Office Action dated Sep. 5, 2019, in the U.S. Appl. No. 15/453,703 (32 pgs).
Interview Summary dated Nov. 19, 2019, in the U.S. Appl. No. 15/453,703 (4 pgs).
Non-Final Office Action Response filed Dec. 5, 2019, in the U.S. Appl. No. 15/453,703 (16 pgs).
Notice of Allowance dated Jan. 25, 2019 in U.S. Appl. No. 15/475,046 24 pgs.
Notice of Allowance dated Jun. 12, 2020 in the related U.S. Appl. No. 15/453,703 12 pgs.
Advisory Action Response filed May 20, 2020 in the related U.S. Appl. No. 15/262,494 12 pgs.
Non-Final Office Action dated Aug. 5, 2020, in related U.S. Appl. No. 16/355,688, (48 pgs).
Non-Final Office Action dated Sep. 10, 2020, in related U.S. Appl. No. 15/262,494, (24 pgs).
Non-Final Office Action dated Sep. 11, 2020, in related U.S. Appl. No. 16/938,966, (23 pgs).

* cited by examiner

SYSTEMS AND METHODS FOR EFFICIENT FACE RECOGNITION

CROSS REFERENCE TO RELATED PATENT APPLICATIONS

This patent application is a continuation of and claims priority to co-pending and commonly-owned U.S. patent application Ser. No. 15/448,194, entitled "SYSTEMS AND METHODS FOR EFFICIENT FACE RECOGNITION", naming as inventors DAXIAO YU, AND YANG SUN and filed Mar. 2, 2017, which application is hereby incorporated herein by reference in its entirety and for all purposes. This application claims benefit under 35 U.S.C. § 119(e) to U.S. Provisional Patent Application No. 62/302,677, filed on Mar. 2, 2016, which is explicitly incorporated by reference herein in its entirety. This application also claims benefit under 35 U.S.C. § 119(e) to U.S. Provisional Patent Application No. 62/305,504, filed on Mar. 8, 2016, which is explicitly incorporated by reference herein in its entirety. This application also claims benefit under 35 U.S.C. § 119(e) to U.S. Provisional Patent Application No. 62/310,524, filed on Mar. 18, 2016, which is explicitly incorporated by reference herein in its entirety. This application also claims benefit under 35 U.S.C. § 119(e) to U.S. Provisional Patent Application No. 62/314,993, filed on Mar. 30, 2016, which is explicitly incorporated by reference herein in its entirety. This application also relates to U.S. patent application Ser. No. 15/262,494, filed on Sep. 12, 2016, which is incorporated herein in its entirety. This application also relates to U.S. patent application Ser. No. 15/331,238, filed on Oct. 21, 2016, which is incorporated herein in its entirety.

BACKGROUND

Technical Field

This invention relates generally to the field of face recognition.

Description of the Related Art

There are tens of millions of paid members today who exercise regularly in gyms, including fitness centers, health clubs, and recreational centers. Many of them follow an exercise routine, either set by themselves or by their trainers, to achieve certain results in personal fitness and health. Therefore, it is important and valuable to track gym members' activities, which can then be used to compare against the pre-set routines and to help adjust or set new goals.

Existing exercise equipment manufacturers have tried to integrate information systems into the equipment. Before gym members start on a piece of equipment, they usually have to register their identification ("ID") information with the equipment so that their activities can be recorded. This procedure of ID registration with each individual equipment may cause inconvenience to the users since the procedure is tedious and error prone. In particular, such additional procedures often break typical exercise routines and add negative impacts to user experience. Consequently, many users choose to use the "quick start" button and bypass the entire registration step.

Another challenge for the gym users is to find an easy way to record their exercise activities. Availability of activity record can help gym users as well as personal trainers to improve gym users' exercise routines and results. Lack of convenient recording tools has caused the lack of the habit of recording exercise activities among gym goers.

Therefore, it is desirable to provide methods and systems to identify a gym user when the user starts on any equipment and record his or her exercise activities on the equipment

BRIEF SUMMARY OF THE INVENTION

In accordance with the disclosed subject matter, systems and methods are provided for efficient face recognition.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

Disclosed subject matter includes, in one aspect, a method of recognizing the face of a user that uses a device in a facility. The method includes receiving, at a face recognition device from a camera, a photo of the user. The method includes extracting, at the face recognition device, a face image of the user from the photo. The method includes receiving, at the face recognition device, a full candidate face set of all registered users. The method includes receiving, at the face recognition device, a first list of registered users that are within the facility. The method includes receiving, at the face recognition device, a second list of registered users that are using other devices in the facility. The method includes generating, at the face recognition device, a reduced candidate face set from the full candidate face set by excluding at least one of (1) one or more candidate faces corresponding to users that are not included in the first list or (2) one or more candidate faces corresponding to users that are included in the second list, from the full candidate face set. The method also includes determining, at the face recognition device, whether the face image corresponds to a candidate face of the reduced candidate face set.

Disclosed subject matter includes, in another aspect, a system of recognizing the face of a user that uses a device in a facility. The facility includes a camera, a memory, and a processor. The camera is configured to capture a photo of the users. The memory is configured to store a module. The processor is configured to run the module stored in the memory that is configured to cause the processor to: receive a full candidate face set of all registered users; receive a first list of registered users that are within the facility; receive a second list of registered users that are using other devices in the facility; generate a reduced candidate face set from the full candidate face set by excluding at least one of (1) one or more candidate faces corresponding to users that are not included in the first list or (2) one or more candidate faces corresponding to users that are included in the second list, from the full candidate face set; and determine whether the face image corresponds to a candidate face of the reduced candidate face set.

Disclosed subject matter includes, in yet another aspect, a non-transitory computer readable medium having executable instructions to cause an apparatus to: receive a full candidate face set of all registered users from a camera attached to a device in a facility; receive a first list of registered users that are within the facility; receive a second list of registered users that are using other devices in the facility; generate a reduced candidate face set from the full candidate face set by excluding at least one of (1) one or more candidate faces corresponding to users that are not included in the first list or (2) one or more candidate faces corresponding to users that are included in the second list, from the full candidate face set; and determine whether the face image corresponds to a candidate face of the reduced candidate face set.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be made to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION OF EMBODIMENTS

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Figure 1:
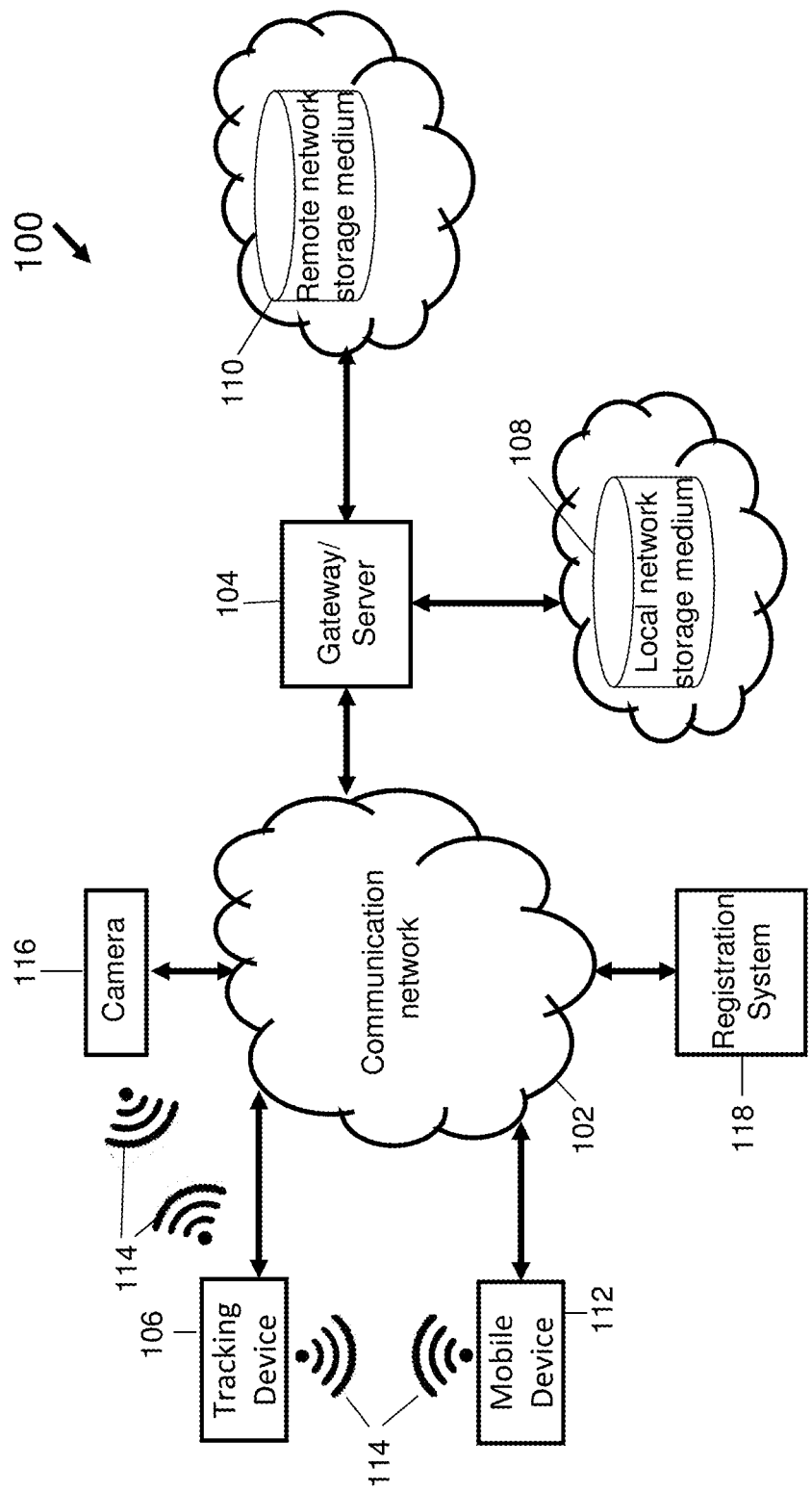
FIG. 1 illustrates an environment for recognizing a user's face and recording the user's activity in a gym according to certain embodiments of the present disclosure.

FIG. 1 illustrates an environment 100 for recognizing a user's face and recording the user's activity in a gym according to certain embodiments of the disclosed subject matter. The environment 100 can include a communication network 102, a server 104, a tracking device 106, a local network storage medium 108, a remote network storage medium 110, a mobile device 112, a wireless network 114, a camera 116, and a registration system 118. Some or all components of the environment 100 can be coupled directly or indirectly to the communication network 102. The components included in the environment 100 can be further broken down into more than one component and/or combined together in any suitable arrangement. For example, in some embodiments, the tracking device 106 and the camera 116 can be combined as one device. Further, one or more components can be rearranged, changed, added, and/or removed. For example, the environment 100 can include more than one tracking device 106, more than one camera 116, and/or more than one mobile device 112.

The tracking device 106 can be attached to an exercise device. Non-limiting examples of exercise devices include treadmills, ellipticals, exercise bikes, rowing machines, stair climbers, weightlifting benches, weight machines, etc. In some embodiments, the tracking device 106 can be attached to an exercise device non-intrusively. In some embodiments, the tracking device 106 can be taken off from one exercise device and attached to another exercise device. The tracking device 106 can be configured to communicate wirelessly with at least one mobile device 112, the server 104, and/or other suitable components of the environment 100. The tracking device 106 can detect when a user or his or her mobile device 112 approaches to the tracking device 106 and notify the mobile device 112 via the wireless network 114. The tracking device 106 can detect when the user or his or her mobile device 112 leaves the tracking device 106 and notify the mobile device 112 via the wireless network 114. In some embodiments, the tracking device 106 can sense or detect movements of an exercise device and/or the user using the exercise device, such as linear motion, rotation, or any suitable combination thereof. The structure and function of the tracking device 106 are described in more detail below.

The mobile device 112 can be connected to the tracking device 106 via the wireless network 114. In some embodiments, the mobile device 112 can also be configured to communicate wirelessly with the server 104 and/or other suitable components of the environment 100. The mobile device can be a tablet computer, a personal digital assistant (PDA), a pager, a mobile or smart phone, a wireless sensor, a wearable device, or any other suitable device.

The communication network 102 can include a network or combination of networks that can accommodate private data communication. For example, the communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows the communication network 102 as a single network; however, the communication network 102 can include multiple interconnected networks listed above.

The server 104 can be a single server, a network of servers, or a farm of servers in a data center. The server 104 can be coupled to a network storage system. The network storage system can include two types of network storage devices: a local network storage medium 108 and a remote network storage medium 110. The local network storage medium 108 and the remote network storage medium 110 can each include at least one physical, non-transitory storage medium, flash memory, a magnetic disk drive, an optical drive, a programmable read-only memory (PROM), a read-only memory (ROM), or any other memory or combination of memories. The local network storage medium 108 and the remote network storage medium 110 can be part of the server 104 or can be separated from the server 104.

In some embodiments, the server 104 can be located within or near a gym or a fitness center. In some embodiments, the server 104 can be located at a remote location. In some embodiments, the server 104 can also include a gateway and/or an access point to direct any signals received from the tracking device 106, the mobile device 112, and/or other components of the environment 100.

In some embodiments, the server 104 manages a database of the registered gym members including registered faces gathered from the registration system 118. In some embodiments, the server 104 also stores the face images captured from the camera 116 and performs face recognition.

In some embodiments, the server 104 manages and stores user exercise data, which is collected by the exercise device with embedded sensors or by sensors attached to the exercise device. In some embodiments, the server 104 stores the exercise data in association with respective users, which can be identified by the face recognition process.

In some embodiments, if during the face recognition process, the server 104 determines that the image quality of the face image is not good enough for recognition, it sends commands back to the camera 116 to retake one or more photos and/or video clips.

In some embodiments, the server 104 may offload some of its computing and/or storage tasks to one or more gateways, as described below.

In some embodiments, the environment 100 may also include one or more gateways that are separate from the server 104. Multiple gateways can be deployed in one gym. In one embodiment, one or more gateway can be used as a communication hub to connect the camera 116 and/or other components of the environment 100 to the server 104.

In some embodiments, besides serving as the communication hub between the camera 116 and/or other components of the environment 100 on one end and the server 104 on the other end, a gateway can also help share the load of computing and reduce data storage required from the server 104. The advantages include, among others, faster response time and lower cloud computing cost.

In some embodiments, a gateway detects faces from one or more photos and/or video clips taken by the camera 116, extracts the face features from the photos, and transmits the extracted features together with the photos to the server 104 for face recognition and image storage.

In some embodiments, the gateway detects faces from the one or more photos and/or video clips taken by the camera 116, extracts the face features from the photos, and performs face recognition locally. In this case, the server 104 only stores the photos received from the gateway. If the gateway determines that the image quality is not good enough for face recognition, it send commands to the camera module to retake one or more photos and restarts the face recognition process.

Furthermore, face recognition tasks can be partitioned and shared between the gateway and the server 104, and the partitioning and sharing can be arranged or rearranged dynamically to meet the face recognition system requirements.

The camera 116 can be attached to an exercise device. In some embodiments, the camera 116 can be attached to an exercise device non-intrusively. In some embodiments, the camera 116 can be taken off from one exercise device and attached to another exercise device. In some embodiments, the camera 116 can be configured to communicate wirelessly with at least one tracking device 106, at least one mobile device 112, the server 104, and/or other suitable components of the environment 100. In some embodiments, the camera 116 can detect when a user starts to use the exercise device that the camera 116 is attached to and start to one or more photos and/or video clips that contain sufficient facial information of one or more users that are near the camera 116. In some embodiments, each exercise device in a gym will have a dedicated camera 116. In some embodiments, one or more exercise devices can share one camera 116. The structure and function of the camera 116 are described in more detail below.

The registration system 118 typically locates near or at the entrance of a facility. for example, the registration system 118 can locate near or at the entrance of a gym. In some embodiments, when a user enters or leaves a gym, he or she will be registered by the registration system 118. In some embodiments, the registration system 118 also includes a camera, which can be configured to acquire one or more photos and/or video clips of a user who sign in at the gym. In some embodiments, each user may register his or her face multiple times, which in general improve the performance of face recognition algorithms. When a registered user walks in the gym and/or starts on an exercise device, face images of the user captured by the camera 116 associated with the exercise device will be compared against registered faces to identify the correct user.

In some embodiments, during the face registration, registered faces need to be validated by the registration system 118 and/or other suitable components of the environment 100. Validation criteria can include one or more of the following: (1) whether the user has a valid membership, and (2) whether the face images captured at the registration system 118 contain sufficient information for recognition purpose.

Each time a user registers at the registration system 118, his or her face information, such as phots or video clips, can be acquired by one of the following embodiments or any combinations of the following embodiments. In one embodiment, the user's face information can be acquired by the camera associated with the registration system 118. In one embodiment, the user's face information can be retrieved from the gym's member management system, where previously taken photos of gym members can be stored. In one embodiment, the user's face images can be acquired from mobile applications running on the user's mobile device 112 and/or other suitable devices associated with the user.

In some embodiments, the tracking device 106, the camera 116, the mobile device 112, and/or other components of the environment 100 can communicate with each other through the wireless connection 114. The wireless connection can be WiFi, ZigBee, IEEE802.15.4, Bluetooth, near field communication (NFC), or another connection using any other suitable wireless protocol standard or combination of standards. In some embodiments, the wireless connection 114 can be the same as the communication network 102. In some embodiments, the wireless connection 114 can be different from the communication network 102.

Figure 2:
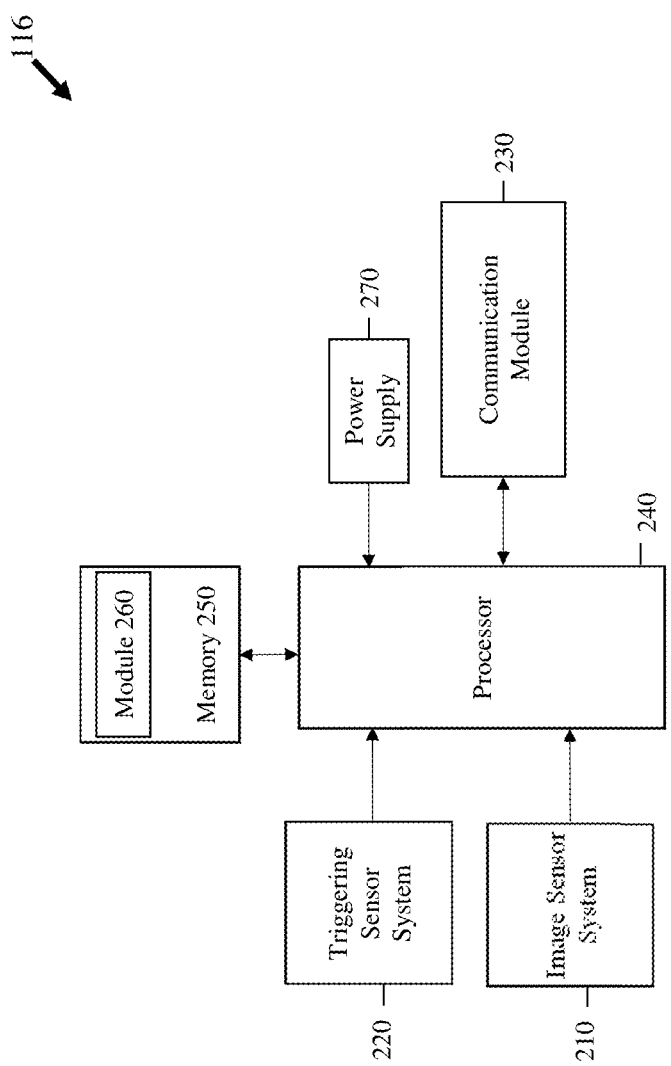
FIG. 2 illustrates a block diagram a camera according to certain embodiments of the present disclosure.

FIG. 2 illustrates a block diagram of a camera 116 according to certain embodiments of the present disclosure. The camera 116 includes an image sensor system 210, a triggering sensor system 220, a wireless transceiver 230, a processor 240, a memory 250, a module 260, and a power supply 270. The components included in the camera 116 can be further broken down into more than one component and/or combined together in any suitable arrangement. Further, one or more components can be rearranged, changed, added, and/or removed.

The image sensor system 210 is configured to take one photos and/or video clips of a user. The image sensor system 210 can include one or more image sensors. In some embodiments, the image sensor can 2-dimensional complementary metal-oxide semiconductor (CMOS) image sensor, 3-dimensional CMOS image sensor, infrared image sensor, charge-coupled device (CCD) image sensors, or Interferometric reflectance imaging sensor.

The triggering sensor system 220 is configured to trigger the image sensor system 210 to take one or more photos and/or video clips of users. In some embodiments, the triggering sensor system 220 can include one or more sensors, such as proximity sensors, a switch that users can turn the camera 116 on or off, and a timer that can be configured to trigger the camera 116 instantly or periodically. In one embodiment, one or more proximity sensors are used to trigger the camera 116. Once a proximity sensor detects that an exercise device is occupied, it triggers the one or more image sensors to take one or more photos and/or video clips. Alternatively, a physical switch (e.g., a touch button) is used to trigger the one or more image sensors to take photos and/or video clips. In yet another embodiment, a command sent to the camera 116 from the gateway or the server 104 via the network connections can also trigger the one or more image sensor to take photos and/or video clips. In yet another embodiment, a command sent to the camera 116 from the tracking device 116 can also trigger the one or more image sensor to take photos and/or video clips.

In some embodiments, the triggering sensor system 220 includes at least one proximity sensor, such as a passive infra-red (PIR) sensor, an ambient light sensor, a photoelectric sensor, an ultrasonic sensor, a time of flight distance sensor, a thermopile sensor, or any other suitable sensors or combination of sensors.

The communication module 230 can be configured to transmit photos and/or video clips to the gateway, the server 104, and/or any other components of the environment 100 through wired or wireless connections. In some embodiments, the communication module 230 can also be configured to receive signals from one or more components of the environment 100. In some embodiments, the communication model 230 can enable the communication with other components of the environment 100 via the wireless network 114.

The processor 240 can include one or more cores and can accommodate one or more threads to run various applications and modules. The software can run on the processor 240 capable of executing computer instructions or computer code. The processor 240 might also be implemented in hardware using an application specific integrated circuit (ASIC), programmable logic array (PLA), field programmable gate array (FPGA), or any other integrated circuit.

The memory 250 can be a non-transitory computer readable medium, flash memory, a magnetic disk drive, an optical drive, a PROM, a ROM, or any other memory or combination of memories.

The processor 240 can be configured to run the module 260 stored in the memory 250 that is configured to cause the processor 240 to perform various steps that are discussed in the disclosed subject matter. In some embodiments, the processor 240 can have one or more post-processing functionalities, such as the image and/or video compression, face detection, face cropping, and/or face feature extraction. In some embodiments, the communication module 230 can transmit the post processing results to server 104 and/or other components of the environment 100 for other tasks, such as face recognition. In some embodiments, the processor 240 can function as a JPEG encoder. After a photo of user is taken, the processor 240 compresses the raw image, and the compressed image is transmitted to the server 104 an/or other suitable components of the environment 100 for post-processing and face recognition The power supply 270 provides power to one or more other components of the camera 116. In some embodiments, the power supply 270 can be a battery source. In some embodiments, the power supply 270 can provide alternating current (AC) and/or direct current (DC) power via an external power source.

In some embodiments, the triggering sensor system 220 can also serve as a power control unit for the image sensor system 210. For example, only when the triggering sensor system 220 recognizes that the exercise device is in use by a user, can the image sensor system 210 take photos and/or video clips of the user.

Figure 6:
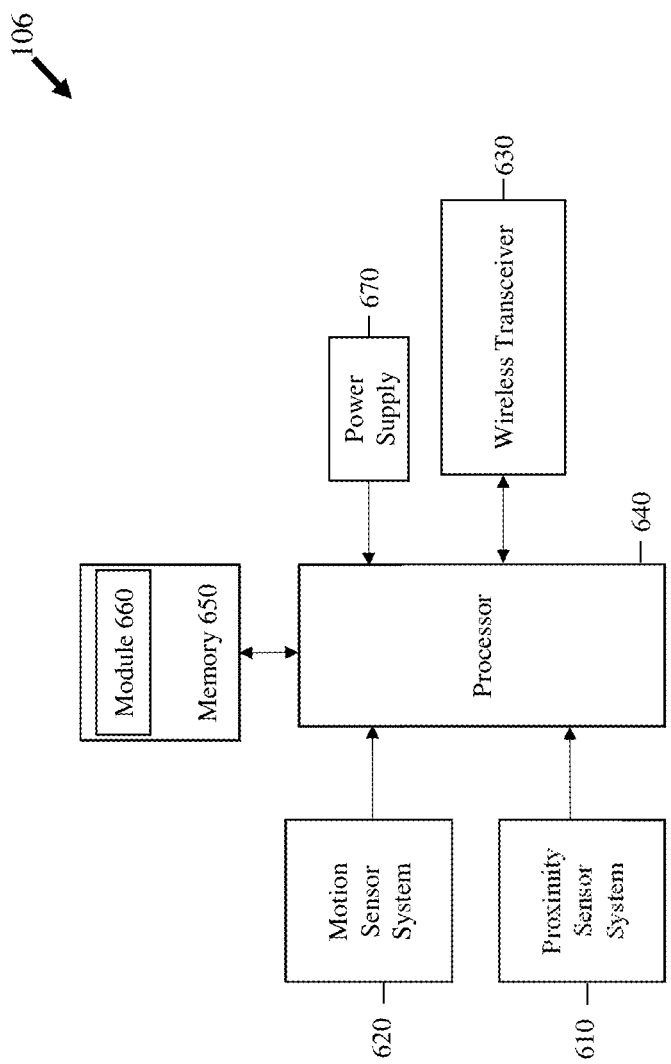
FIG. 6 illustrates a block diagram of a tracking device according to certain embodiments of the present disclosure.

FIG. 6 illustrates a block diagram of a tracking device 106 according to certain embodiments of the present disclosure. The tracking device 106 includes a proximity sensor system 610, a motion sensor system 620, a wireless transceiver 630, a processor 640, a memory 650, a module 660, and a power supply 670. The components included in the tracking device 106 can be further broken down into more than one component and/or combined together in any suitable arrangement. Further, one or more components can be rearranged, changed, added, and/or removed.

The proximity sensor system 610 can be configured to detect when a user with a mobile device 112 and/or the mobile device 112 enters within a first proximity value of the proximity sensor system 610. The proximity sensor system 610 can also be configured to detect when the user or the mobile device 112 becomes outside a second proximity value of the proximity sensor system 610. In some embodiments, the first proximity value is the same as the second proximity value. In some embodiments, the first proximity value is different from the second proximity value. For example, the proximity sensor system 610 may use a smaller proximity value to determine when the user is going to use the exercise device and a larger proximity value to determine when the user is going to leave the exercise device. In some embodiments, the proximity value can be based on distance, such as 1 cm, 5 cm, or any other suitable distance. In some embodiments, the proximity value can be based on area, such as 0.2 $m^2$, 0.5 $m^2$, or any other suitable area. When the proximity sensor system 610 detects the mobile device 112 and/or the user enters within the proximity value of the proximity sensor system 610, it can generate an onboard signal. In some embodiments, when the proximity sensor system 610 detects the mobile device 112 and/or the user becomes outside the second proximity value of the proximity sensor system 610, it can generate a departure signal.

The proximity sensor system 610 includes at least one proximity sensor, such as a passive infra-red (PIR) sensor, an ambient light sensor, a photoelectric sensor, an ultrasonic sensor, a time of flight distance sensor, a thermopile sensor, or any other suitable sensors or combination of sensors.

In typical occupancy sensor or motion sensor designs, it may be important to design a sensor function with a wide detection angle and a long detection range, so that the detection coverage area is large. In some embodiments of the present disclosure, however, to detect whether an exercise device is occupied, a large coverage area may trigger many false positive alarms. It is because even if a user is not using the equipment, as long as he or she is close enough to the equipment, the sensor will still be triggered. To solve this problem, in some embodiments the occupancy sensor can be designed so that it will be triggered only when a user is in close proximity of the equipment or on the equipment. It may be possible to limit a proximity sensor's coverage area or range, for example, by specific design of the sensor lens and sensor housing, as well as sensor placement during the installation stage.

Figure 5:
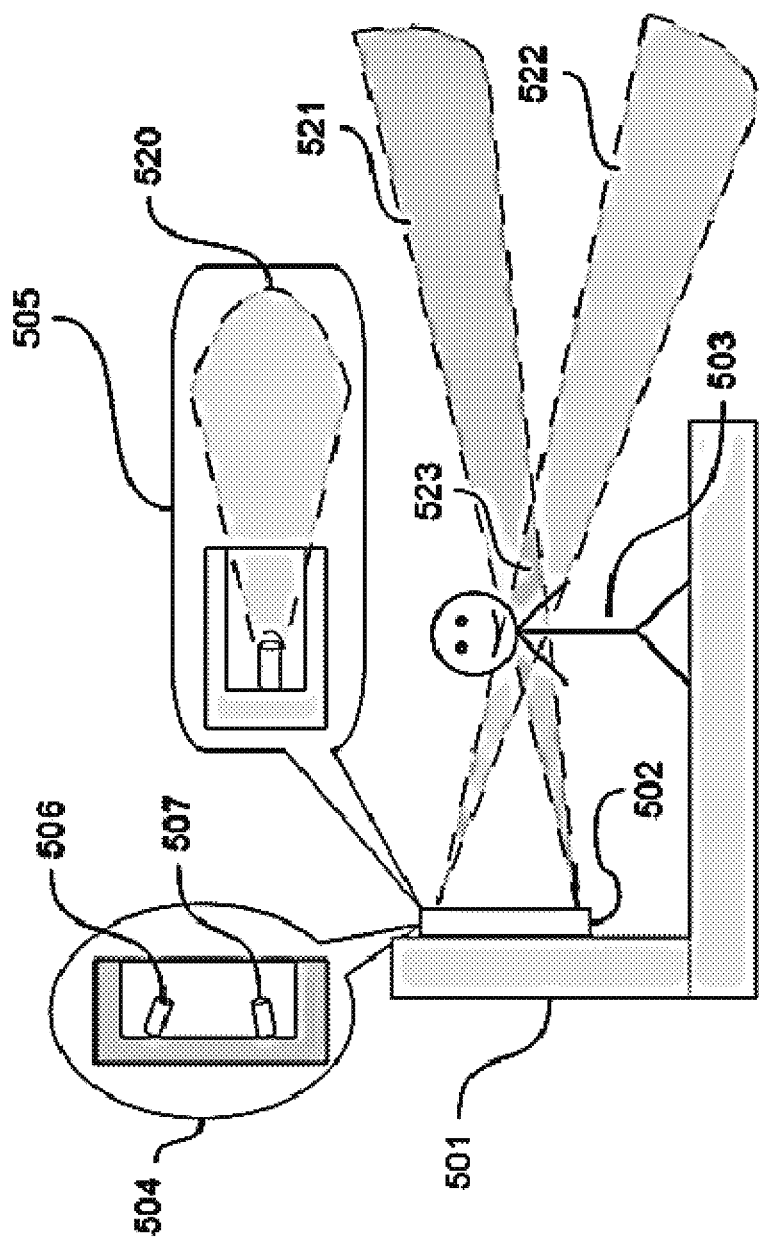
FIG. 5 shows an arrangement of two proximity sensors according to certain embodiments of the present disclosure.

In one embodiment, the proximity sensor system 610 includes one or more PIR sensors. Each of the one or more PIR sensors has its own coverage area, and they are placed in a way such that the intersection of the coverage areas is limited. When the user and/or the mobile device 112 are in the limited area, each of the one or more PIR sensors can be triggered. FIG. 5 illustrates an exemplary design of the proximity sensor including two PIR sensors according to one embodiment of the present disclosure.

FIG. 5 shows an arrangement of two proximity sensors according to certain embodiments of the present disclosure. As shown in FIG. 5, a proximity sensor system 502 includes two PIR sensors 506 and 507, which are installed on an exercise device 501. A user 503 is using the exercise device 501. The side view 504 of the proximity sensor 502 shows the placement of the two PIR sensors 506 and 507. The top view 505 shows the top view of the proximity sensor's coverage 520. A side view 521 of the sensing unit 507's coverage and a side view 522 of the sensing unit 506's coverage intersect at an area 523, which is currently occupied by the user 503. Whenever a user gets into the intersection area 523, the proximity sensor 502 detects that the user 503 is within a proximity value of the equipment 501.

In some embodiments, the proximity sensor system 610 may include more than one type of proximity sensor. For example, the proximity sensor system 610 can use an ambient light sensor to detect when the user and/or the mobile device 112 is approaching the exercise device and a PIR sensor to detect when the user and/or the mobile device 112 leaves the exercise device. In some embodiments, the detection threshold of the ambient light sensor can be smaller than the detection threshold of the PIR sensor.

The motion sensor system 620 can be configured to detect motions of a user associated with the mobile device 112. As non-limiting examples, the motion sensor system 620 can detect how many times a user exercises with a pin-loaded or plate-loaded device, a free weight device, or power racks. The motion sensor system 620 can include one or more motion detection sensors, such as accelerometers, gyroscopes, vibration sensors, pressure sensors, or any other suitable sensors or combination of sensors. The design and functionality of the motion detection sensors are described in more detail in U.S. patent application Ser. No. 15/262,494, titled "Smart Fitness and Exercise Equipment," which was filed on Sep. 12, 2016 and is incorporated herein in its entirety.

The wireless transceiver 630 can be configured to transmit signals to the mobile device 112 and/or any other components of the environment 100. In some embodiments, the wireless transceiver 630 can also be configured to receive signals from the mobile device 112 and/or any other components of the environment 100. The wireless transceiver 630 can enable the communication with the mobile device 112 via the wireless network 114. For example, the wireless transceiver 630 can send a notification signal that notifies the mobile device 112 when the mobile device 112 and/or the user enters within the proximity value of the proximity sensor system 610. The notification signal can also include identification information of the exercise device to which the tracking device 106 is attached. Non-limiting examples of the identification information include the unique low-power wireless interface ID, the type of the exercise device, and/or the identification number of the device. In some embodiments, the wireless transceiver 630 can send another notification signal to the mobile device 112 when the mobile device 112 or the user becomes outside the second proximity value of the proximity sensor system 630. In some embodiments, the wireless transceiver 630 can receive at least one reporting signal from the mobile device 112. As a non-limiting example, the report signal can be related to the motions of a user associated with the mobile device 112. In some embodiments, the wireless transceiver 630 can send one or more status signals to the server 104 and/or the gateway. As non-limiting examples, the status signals can include the payload of the notification signal sent by the wireless transceiver 630, the battery level of the tracking device 106, or run-time statistics of the tracking device 106 and/or the mobile device 112.

The processor 640 can include one or more cores and can accommodate one or more threads to run various applications and modules. The software can run on the processor 640 capable of executing computer instructions or computer code. The processor 640 might also be implemented in hardware using an application specific integrated circuit (ASIC), programmable logic array (PLA), field programmable gate array (FPGA), or any other integrated circuit.

The memory 650 can be a non-transitory computer readable medium, flash memory, a magnetic disk drive, an optical drive, a PROM, a ROM, or any other memory or combination of memories.

The processor 640 can be configured to run the module 660 stored in the memory 650 that is configured to cause the processor 640 to perform various steps that are discussed in the disclosed subject matter. For example, the module 660 can be configured to cause the processor 640 to receive an onboard signal from the proximity sensor system 610 indicating when the mobile device 112 and/or the user enters within the proximity value of the proximity sensor system 610. The module 660 can be configured to cause the processor 640 to, in response to receiving the onboard signal, generate a command signal that causes the wireless transceiver 630 to send a notification signal to the mobile device 112. The notification signal can notify the mobile device 112 when the mobile device 112 and/or the user enters within the proximity value of the proximity sensor system 610. The notification signal can also include identification information of the exercise device to which the tracking device 106 is attached. In some embodiments, the module 660 can be configured to cause the processor 640 to receive a departure signal from the proximity sensor system 610 indicating when the mobile device 112 and/or the user become outside the second proximity value of the proximity sensor system 610. And in response to receiving the departure signal, it can generate a second command signal that causes the wireless transceiver 630 to send a second notification signal to the mobile device 112, where the second notification signal notifies the mobile device 112 when the mobile device 112 and/or the user becomes outside the second proximity value of the proximity sensor system 610.

The power supply 670 provides power to one or more other components of the tracking device 106. In some embodiments, the power supply 670 can be a battery source. In some embodiments, the power supply 670 can provide alternating current (AC) and/or direct current (DC) power via an external power source.

Figure 7:
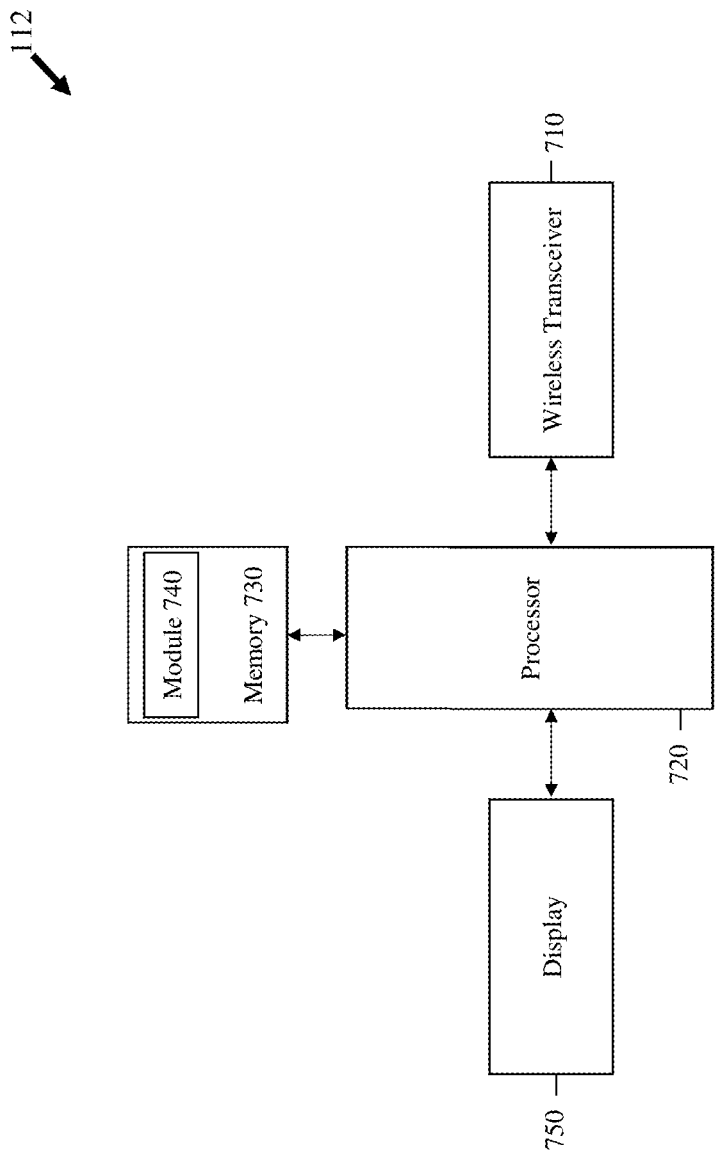
FIG. 7 illustrates a block diagram of a mobile device according to certain embodiments of the present disclosure.

FIG. 7 illustrates a block diagram of a mobile device 112 according to certain embodiments of the present disclosure. The mobile device 112 includes a wireless transceiver 710, a processor 720, a memory 730, a module 740, and a display screen 750. The components included in the mobile device 112 can be further broken down into more than one component and/or combined together in any suitable arrangement. Further, one or more components can be rearranged, changed, added, and/or removed.

Referring to the wireless transceiver 710, the wireless transceiver 710 can be configured to receive signals from the tracking device 106 and/or any other components of the environment 100. In some embodiments, the wireless transceiver 710 can also be configured to transmit signals to the tracking device 106 and/or any other components of the environment 100. The wireless transceiver 710 can enable the communication with the tracking device 106 via the wireless network 114. For example, the wireless transceiver 710 can receive a notification signal from the tracking device 106. The notification signal can indicate when the mobile device 112 and/or the user enters within the proximity value of the tracking device 106. The notification signal can also include identification information of the exercise device to which the tracking device is attached. In some embodiments, the wireless transceiver 710 can receive a second notification signal from the tracking device 106. The second notification signal can indicate when the mobile device 112 or the user becomes outside the second proximity value of the tracking device 106. In some embodiments, the wireless transceiver 710 can also be configured to transmit a report generated by the mobile device 112 to the tracking device 106 and/or other components of the environment 100.

The processor 720 can include one or more cores and can accommodate one or more threads to run various applications and modules. The software can run on the processor 720 capable of executing computer instructions or computer code. The processor 720 can also be implemented in hardware using an ASIC, PLA, FPGA, or any other integrated circuit.

The memory 730 can be a non-transitory computer readable medium, flash memory, a magnetic disk drive, an optical drive, a PROM, a ROM, or any other memory or combination of memories.

The processor 720 can be configured to run the module 740 stored in the memory 730 that is configured to cause the processor 720 to perform various steps that are discussed in the disclosed subject matter. For example, the module 740 can be configured to cause the processor 720 to receive the notification signal from the tracking device 106 via the wireless transceiver 710. The notification signal can indicate when the mobile device 112 and/or the user enters within the proximity value of the tracking device 106. The notification signal can also include identification information of the exercise device to which the tracking device 106 is attached. The module 740 can be configured to cause the processor 720 to detect a received signal strength (RSS) of the notification signal. The module 740 can be configured to cause the processor 720 to determine whether the RSS is above or at a pre-determined threshold. The pre-determined threshold can be −10 dBm, −20 dBm, or any other suitable value. When RSS is above or at the pre-determined threshold, the module 740 can be configured to cause the processor 720 to record the identification information of the exercise device that the tracking device 106 is attached to and establish a link between the tracking device 106 and the mobile device 112. When the RSS is below the pre-determined threshold, the module 740 can be configured to cause the processor 720 to ignore the notification signal. In some embodiments, when the RSS of the notification signal is above or at the pre-determined threshold, the module 740 can be configured to cause the processor 720 to record a start time associated with the notification signal. In some embodiments, the module 740 can be configured to cause the processor 720 receive a second notification signal from the tracking device 106 via the transceiver 710. The second notification signal can indicate when the mobile device 112 and/or the user becomes outside a second proximity value of the tracking device 106. In some embodiments, the module 740 can be configured to cause the processor 710 to, in response to receiving the second notification signal, record an end time associated with the second notification signal. In some embodiments, the module 740 can be configured to cause the processor 710 to generate a report based on the start time, the end time, and the identification information.

The module 740 can include a mobile application. In some embodiments, the application may be downloaded and used by a user to keep track of his or her exercise on a real-time basis from the mobile device 112. In some embodiments, the user can check current or past records of the exercises from the server 104 and/or other components of the environment 100. In general, the application may comprise a login or registration module for users to manage their profile or account information, a primary user interface that integrates most functions of the application, and a configuration or settings module. For instance, the primary user interface of the application may allow the users to receive and view reminders, notifications and reports of their exercise or workout activities.

Referring to the display screen 750, the display screen 750 can be configured to display various exercise reports generated by the mobile device 112. The display screen 750 can be a touch screen, an LCD screen, and/or any other suitable display screen or combination of display screens.

As noted above, one way for the environment 100 to identify a user is through face recognition. With the rapid progress in the research area of neural networks, face recognition algorithms have been improved continuously and deployed in real life applications, such as office building access control and online member identification systems. Performance of the face recognition algorithms is typically measured by the false acceptance rate and false rejection rate, while improvements in performance are often benchmarked by reductions in the false rejection rate at a given false acceptance rate.

It is often the case that for a given face recognition algorithm, the false rejection rate increases as the number of faces in the candidate face set increases. Even a lower-than-expected false rejection rate can cause inconvenience. For example, when a false rejection happens, multiple retries and/or manual intervention are required to resolve it. This problem may get worse when the number of faces in the candidate face set increases.

In some embodiments of the present disclosure, the environment 100 concerns specific face recognition applications in which only a limited number of faces need to be recognized out of a fairly large candidate face set at any given time. The data collection system for a fitness club or gym is an example of such application. Even if the fitness club or gym has more than ten thousand registered members, there are only a limited number of members (e.g., a couple of hundreds) that can be using the facilities of the club simultaneously at a moment. This is because not only members come and go at random rates, but also the facilities possess limited capacity in terms of equipment and space.

Figure 3A:
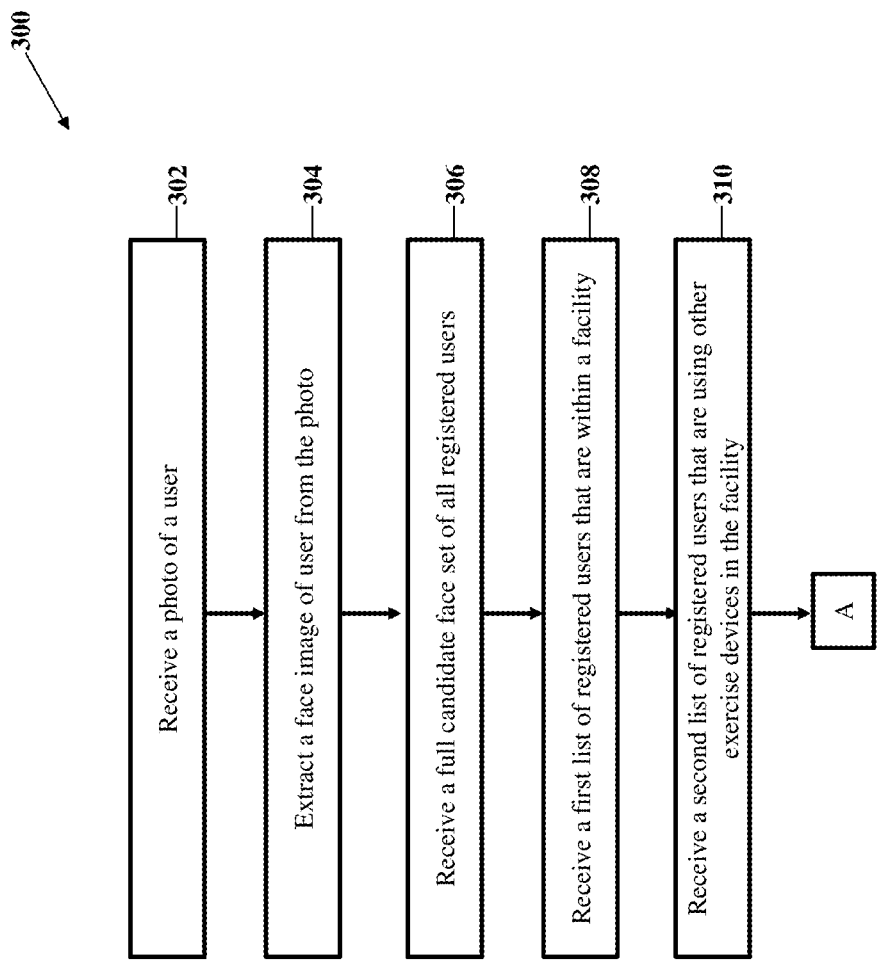
FIGS. 3A and 3B are flow chars illustrating an efficient face recognition process according to certain embodiment of the present disclosure.
Figure 3B:
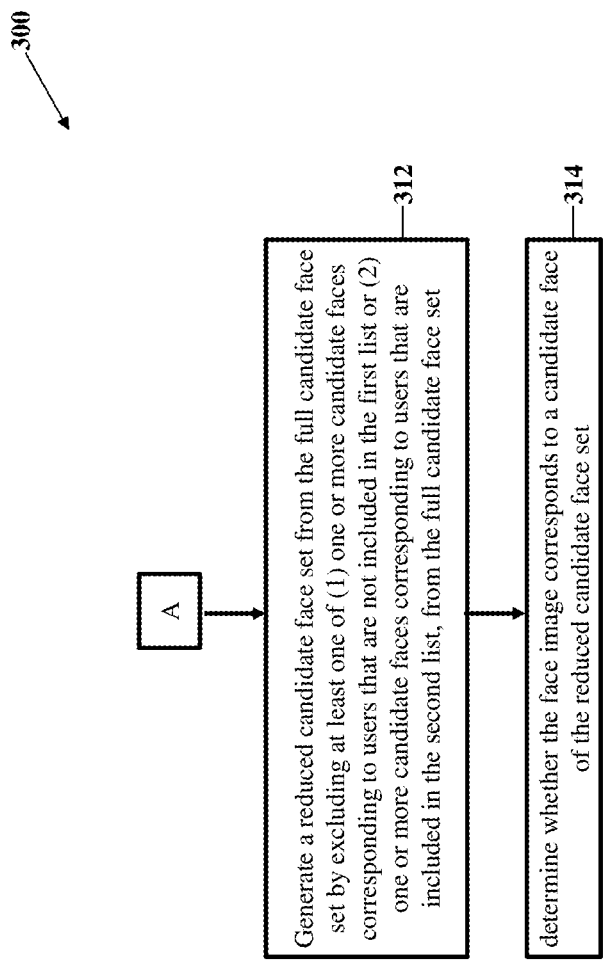

FIGS. 3A and 3B are flow charts illustrating a process 300 of recognizing a user's face according to certain embodiments of the present disclosure. The process 300 includes one or more steps described below to effectively reduce the size of candidate face set applied in face recognition. The process 300 is illustrated from the perspective of a face recognition device. In some embodiments, the face recognition device is the camera 116, so both the face image capture and face recognition happen at the camera 116. In some embodiments, the face recognition device is at a gateway inside a gym. In some embodiments, the face recognition device is the server 104, which can locate remotely from a gym. In some embodiments, the face recognition device can be a device other than the camera 116, the server 04, and the gateway, and the face recognition device can locate at an exercise device, other places inside a gym/facility, or places that are remote from the gym/facility. In some embodiments, the process 300 can be modified by, for example, having steps rearranged, changed, added, and/or removed.

At step 302, the face recognition device receives a photo or a video clip from the camera 116. In some embodiments, the camera 116 is triggered to take a photo or a video clip of a user that uses an exercise device that the camera 116 is associated with. The process 300 then proceeds to step 304.

At step 304, the face recognition device extracts a face image of the user from the photo or the video clip acquired by the camera 116. In some embodiments, when the face recognition device receives a photo or extracts a photo form a video clip, the face recognition device reduces the size of the photo by cropping the boundaries of the photo. In some embodiments, the cropped photo essentially only includes facial information of a user. In some embodiments, when the face recognition device receives a photo or extracts a photo form a video clip, the photo includes a plurality of candidate face images (for example, face images of multiple users), and the face recognition device extracts a face image from the photo by choosing one of the candidate face images that either has the largest size or appears closes to the camera 116. The process 300 then proceeds to step 306.

At step 306, the face recognition device receives a full candidate face set of all registered users. For example, the full candidate face set can be face images of all registered users of a fitness club nationwide. If the fitness club has 100,000 registered users nationwide, then the full candidate face set can be all stored faces that correspond to that 100,000 registered users. The process 300 then proceeds to step 308.

At step 308, the face recognition device receives a first list of registered users that are within a facility. For example, when the camera 116 takes a photo or a video clip of a user Y in gym A, then the first list of registered users includes registered users that are currently checked in at gym A. For example, if there are 300 users that currently are checked in at gym A when the camera 116 takes a photo or a video clip of the user Y in gym A, then the first list of registered users includes these 300 users. In some embodiments, the check-in information of the members can be obtained from the registration system 118. The process 300 then proceeds to step 310.

At step 310, the face recognition device receives a second list of registered users that are using other exercise devices in the facility. For example, if the photo or video clip of the user Y is taken by a camera 116 that is associated with treadmill B in gym A, then the second list includes all the registered users that are known to be using other exercise devices, such as treadmills other than treadmill B and/or other exercise devices, in gym A. For example, if it is known that there are 100 users that are using other exercise devices in gym A while the user Y is using treadmill B in gym A, then the second list of registered users includes these 100 users. The process 300 then proceeds to step 312.

At step 312, the face recognition device generates a reduced candidate face set from the full candidate face set by excluding at least one of (1) one or more candidate faces corresponding to users that are not included in the first list or (2) one or more candidate faces corresponding to users that are included in the second list, from the full candidate face set.

In some embodiments, the reduced candidate face set is generated by excluding all candidate faces corresponding to users that are not included in the first lists. In other words, the reduced candidate face set is generated by including all candidate faces corresponding to users that are included in the first lists. Using the numerical examples noted above in connection with steps 306-310, the candidate face set is reduced to candidate faces that correspond to the 300 users in the first list from candidate faces that correspond to all 100,000 registered users nationwide.

In some embodiments, the reduced candidate face set is generated by excluding all candidate faces corresponding to users that are included in the second lists. Using the numerical examples noted above in connection with steps 306-310, the candidate face set is reduced to candidate faces that correspond to the 99,900 users that are not in the second list from candidate faces that correspond to all 100,000 registered users nationwide.

In some embodiments, the reduced candidate face set is generated by excluding both (1) one or more candidate faces corresponding to users that are not included in the first list and (2) one or more candidate faces corresponding to users that are included in the second list, from the full candidate face set.

In some embodiments, the reduced candidate face set is generated by excluding both (1) all candidate faces corresponding to users that are not included in the first list and (2) all candidate faces corresponding to users that are included in the second list, from the full candidate face set. Using the numerical examples noted above in connection with steps 306-310, the candidate face set is reduced to candidate faces that correspond to the 200 users that are in the first list but not in the second list from candidate faces that correspond to all 100,000 registered users nationwide. The process 300 then proceeds to step 314.

At step 314, the face recognition determines whether the face image corresponds to a candidate face of the reduced candidate face set.

In some embodiments, since the registered members of a gym is known a priori, the face recognition algorithm can divide the faces of members into groups a priori based on similarity. Similarity measures vary for different face recognition algorithms. An example of facial similarity is defined by Euclidian distances between extracted features of candidate faces. Based on such grouping, the face recognition algorithm can further reduce the candidate face set by focusing on similar groups. When a target face is found to be similar to one or more face groups, only the faces in the one or more groups will be compared against the target face. Note that the faces in the one or more groups can be further limited to include only members who have checked in, as described above.

In some embodiments, any recognized faces can be added to the corresponding user's face set, which may improve the performance of the face recognition algorithm.

In some embodiments, when the recorded exercise data is present to the corresponding user through mobile app or web services, the user may either confirm or decline the record. User confirmation corroborates the face recognition, while user decline indicates that the face recognition algorithm may have identified the wrong member. When the exercise record is rejected, the face recognition algorithm can use the case as a valuable feedback, exclude the mistakenly identified user, and restart the face recognition task.

In any case, if the face recognition algorithm fails to recognize faces due to insufficient information captured, it can instruct the camera 116 to retake one or more photos and/or video clips and restart the recognition process.

Figure 8:
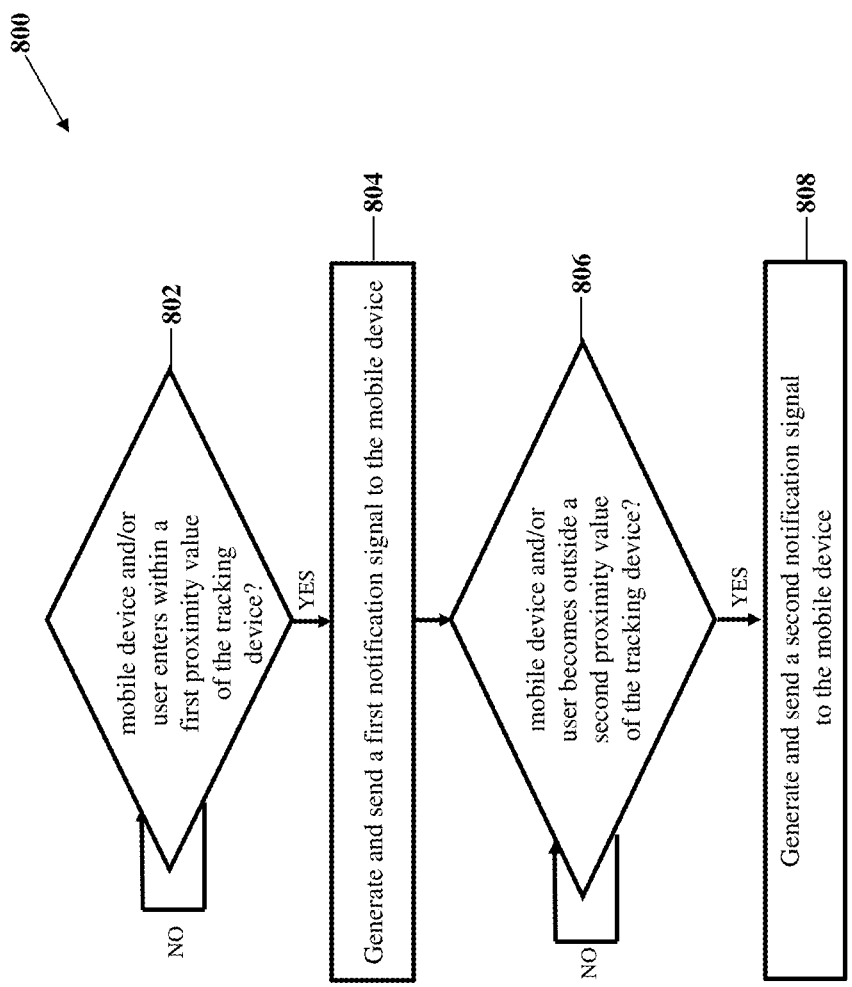
FIG. 8 is a flow chart illustrating a process of tracking, collecting, and/or analyzing user data for gyms according to certain embodiments of the present disclosure.

FIG. 8 is a flow chart illustrating a process 800 of tracking, collecting, and/or analyzing user data for gyms according to certain embodiments of the present disclosure. The process 800 is mainly illustrated from the perspective of the tracking device 106. In some embodiments, the process 800 can be modified by, for example, having steps rearranged, changed, added, and/or removed.

At step 802, the tracking device 106 detects when a mobile device 112 or the user associated with the mobile device 112 enters within a proximity value of the tracking device 106. In some embodiments, the tracking device 106 can detect when (1) the user is in its proximity, (2) the mobile device 112 is in its proximity, or (3) both the user and the mobile device 112 are in its proximity, or a sequence of one or more of the three conditions above. For example, the sequence of events can be: first a user is detected, then the mobile device 112 is detected. In some embodiments, as described in connection with FIG. 5, the tracking device 106 can use more than one sensor to determine whether or not the mobile device and/or the user associated with the mobile device enters within the proximity value of the tracking device 106. When the tracking device 106 determines the mobile device 112 and/or the user enters within the proximity value of the tracking device, the process 800 proceeds to step 804.

At step 804, the tracking device 106 generates and sends a first notification signal to the mobile device 112. The first notification signal can notify the mobile device 112 when the mobile device 112 and/or the user enters within the proximity value of the tracking device 106. The notification signal can also include identification information of the exercise device that the tracking device 106 is attached to.

In some embodiments, when the user and/or the mobile device 112 is within the proximity value of the tracking device 106, the tracking device 106 can detect, through its motion sensor system 620, the exercise activities that the user is conducting on/with the exercise device, such as how many chest presses have been conducted. The tracking device 106 can report the exercise activities to the mobile device 112 and/or other components of the environment 100 either periodically or when the tracking device 106 later detects that the mobile device 112 and/or the user becomes outside a second proximity value of the tracking device 106.

At step 806, the tracking device 106 detects when the mobile device 112 and/or the user becomes outside the second proximity value of the tracking device 106. When the tracking device 106 determines the mobile device 112 and/or the user becomes outside the second proximity value of the tracking device 106, the process 800 proceeds to step 808.

At step 808, the tracking device 106 generates and sends a second notification signal to the mobile device 112. The second notification signal can notify the mobile device 112 when the mobile device 112 and/or the user becomes outside the second proximity value of the tracking device 106.

Figure 9A:
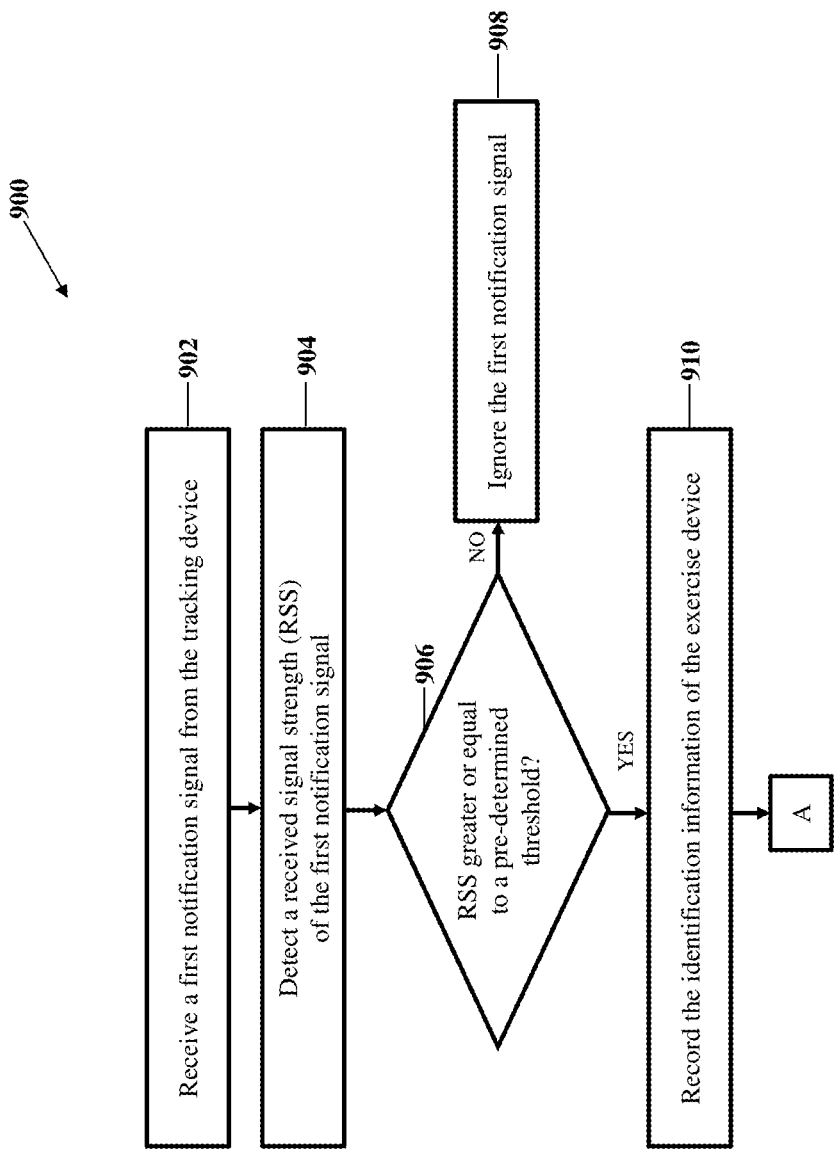
FIGS. 9A and 9B are flow charts illustrating a process of tracking, collecting, and/or analyzing user data for gyms according to certain embodiments of the present disclosure.
Figure 9B:
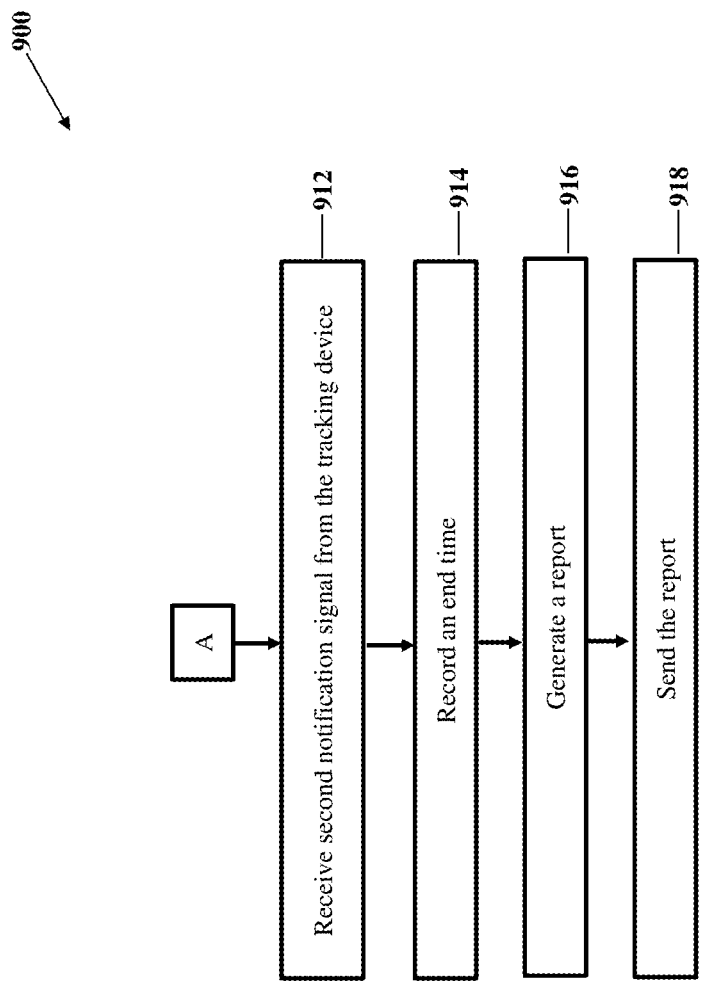

FIGS. 9A and 9B are flow charts illustrating a process 900 of tracking, collecting, and/or analyzing user data for gyms according to certain embodiments of the present disclosure. The process 900 is mainly illustrated from the perspective of the mobile device 112. In some embodiments, the process 900 can be modified by, for example, having steps rearranged, changed, added, and/or removed.

At step 902, the mobile device 902 receives a first notification signal from the tracking device 106. The first notification signal can indicate when the mobile device 112 and/or the user associated with the mobile device 112 enters within a proximity value of the tracking device 106. The notification signal can also include identification information of the exercise device that is attached to the tracking device 106.

At step 904, the mobile device 112 detects the RSS of the first notification signal.

At step 906, the mobile device 112 determines whether the RSS of the first notification signal is above or at a pre-determined threshold. If the RSS of the first notification signal is above or at the pre-determined threshold, the process 900 proceeds to step 910. If the RSS of the first notification signal is below the pre-determined threshold, the process 900 proceeds to step 908.

At step 908, the mobile device 112 ignores the first notification signal and does not process it further.

At step 910, the mobile device 112 records the identification information of the exercise device. In some embodiments, the mobile device 112 also registers the exercise device and establishes a link between the tracking device 106. In some embodiments, the mobile device 112 ignores notification signals from other tracking devices until the mobile device 112 is notified that it leaves the tracking device 106. In some embodiments, the mobile device 112 also records a start time associated with the receipt of the first notification signal.

At step 912, the mobile device 112 receives a second notification signal from the tracking device 106. The second notification signal can indicate when the mobile device 112 or the user leaves the proximity value of the tracking device 106.

At step 914, the mobile device 112 records an end time associated with the receipt of the second notification signal.

At step 916, the mobile device 112 generates an exercise report of the user based on the start time, the end time, and the identification information of the exercise device. For example, the report can be a summary of the user's work-out session associated with the exercise device. The report can also include one or more items described in connection with FIG. 4.

At step 918, the mobile device 112 sends the exercise report to the tracking device 106, the server 104, and/or other suitable components of the environment 100.

Figure 10A:
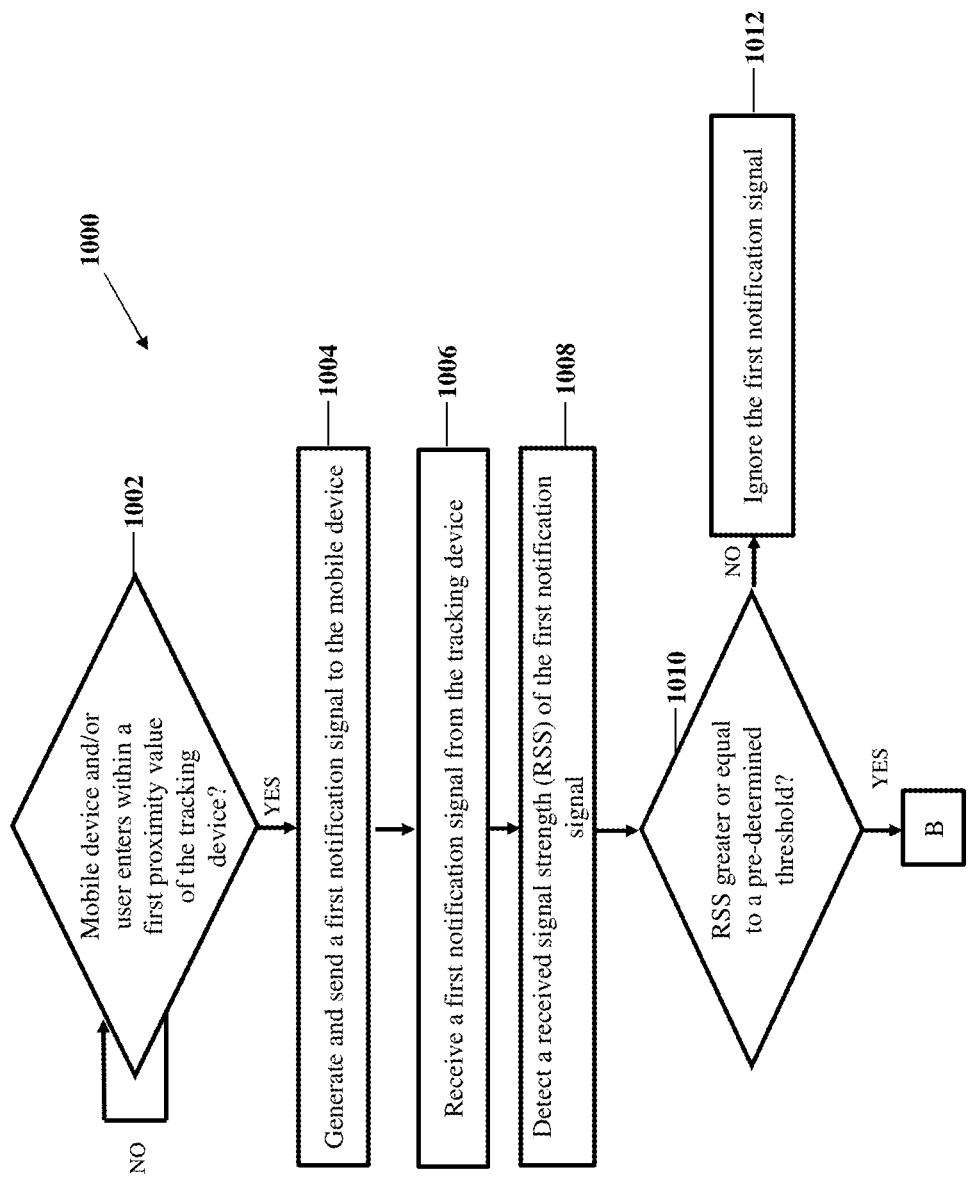
FIGS. 10A and 10B are flow charts illustrating a process of tracking, collecting, and/or analyzing user data for gyms according to certain embodiments of the present disclosure.
Figure 10B:
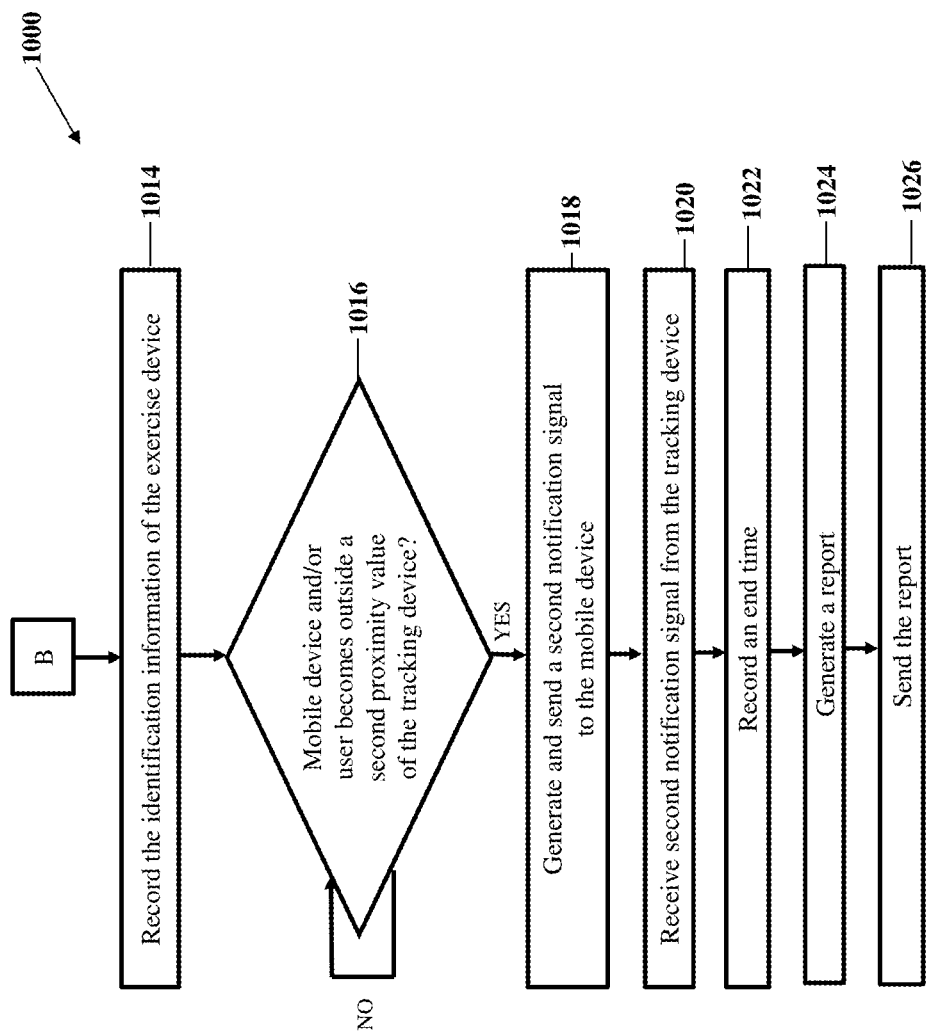

FIGS. 10A and 10B are flow charts illustrating a process 1000 of tracking, collecting, and/or analyzing user data for gyms according to certain embodiments of the present disclosure. The process 1000 is mainly illustrated from the perspective of the interaction between the tracking device 106 and mobile device 112. In some embodiments, the process 1000 can be modified by, for example, having steps rearranged, changed, added, and/or removed.

The steps of the process 1000 are similar to various steps of the process 800 and the process 900. For example, the steps 1002 and 1004 are similar to the steps 802 and 804, respectively; the steps 1006, 1008, 1010, 1012, and 1014 are similar to the steps 902, 904, 906, 908, and 910, respectively; the steps 1016 and 1018 are similar to the steps 806 and 808, respectively; and the steps 1020, 1022, 1024, and 1026 are similar to the steps of 912, 914, 916, and 918, respectively.

In the present disclosure, there are several ways for the tracking device 106 to detect when the user finishes using the exercise device. For example, in some embodiments, the tracking device 106 detects when the user and/or the user's mobile device 112 becomes outside a certain proximity value of the tracking device 106. As described earlier, the proximity value used to determine when the mobile device 112 and/or the user starts to use the exercise device can be the same as or different from the proximity value used to determine when the mobile device 112 and/or the user leaves the exercise device. In some embodiments, when the user is about to use the exercise device, she first holds her mobile device 112 close to the tracking device 106 so that the tracking device 106 knows the user is going to start a session. When the user finishes using the exercise device, she holds her mobile device 112 close to the tracking device 106 again so that the tracking device 106 knows the user is going to finish the session. Several use cases are explained below.

In one embodiment, when a user is ready to use an exercise device, she first holds her mobile device 112 close to the tracking device 106 attached to the exercise device. The proximity sensor system 610 of the tracking device 106, such as an ambient light proximity sensor, senses the mobile device 112 is in its proximity, and triggers the tracking device 106 to broadcast notification signals, which include the equipment ID of the exercise device, to the mobile device 112 and/or other components of the environment 100. When the user finishes using the exercise device, she can hold her mobile device 112 close to the tracking device 106 again. Once the proximity sensor system 610, such as the ambient light proximity sensor, detects it, the tracking device 106 knows this is after the first time the user holds her mobile device 112 close to the tracking device 106, and therefore broadcast notification signals, which include exercise results, to the mobile device 112 and/or other components of the environment 100. The user's mobile device 112 receives such notifications and stores the exercise information.

In another embodiment, when a user is ready to use an exercise device, he first holds his mobile device 112 close to the tracking device 106 attached to the exercise device. The proximity sensor system 610 of the tracking device 106, such as one or more PIR sensor, senses the mobile device 112 is in its proximity, and triggers the tracking device 106 to broadcast notification signals, which include equipment ID of the exercise device, to the mobile device 112 and/or other components of the environment 100. When the user finishes using the exercise device, he can hold her mobile device 112 close to the tracking device 106 again. Once the proximity sensor system 610, such as the one or more PIR sensors, detects it, the tracking device 106 knows this is after the first time the user holds her mobile device 112 close to the tracking device 106, and therefore broadcast notification signals, which include exercise results, to the mobile device 112 and/or other components of the environment 100. The user's mobile device 112 receives such notifications and stores the exercise information.

In yet another embodiment, when a user is ready to use an exercise device, he first holds his mobile device 112 close to the tracking device 106. The proximity sensor system 610 of the tracking device 106 senses the mobile device 112 is in its proximity, then broadcasts notifications, which can include equipment type and ID. When he finishes using the equipment, he simply leaves the exercise device, without holding his mobile device 112 close to the tracking device 106. The proximity sensor system 610 detects the user is leaving, and therefore broadcast notification signals, which include exercise results, to the mobile device 112 and/or other components of the environment 100. The user's mobile device 112 receives such notifications and stores the exercise information.

When the mobile device 112 first receives notification signals indicating the start of a work-out session from one or more exercise devices, it picks the message with the strongest received signal strength (RSS) which passes a predetermined threshold. Then the mobile device 112 remembers the identity information from this exercise device and ignores notification messages from all other exercises devices hereafter. The identity information that serves as the filtering criteria can be the unique low-power wireless interface ID, the equipment ID, or any other suitable information or combinations of the information. When the user finishes the exercise and leaves the equipment, then as described above, the proximity sensor system 610 triggers the tracking device 106 to broadcast notification signals to indicate the end of the current session. Once received, the mobile device 112 forgets the current identity information upon receiving such end-session notification signals.

The tracking device 106 and the mobile device 112 can communicate with the server 104. In some embodiments, when the server 104 locates remotely as a server 104, it communicates with the tracking device 106 and/or the mobile device 112 through the gateway. For example, when the tracking device 106 transmits a notification signal to the mobile device 112, it can send the payload of the notification signal, and optionally other vital related information, such as remaining battery level, run-time statistics, or any other suitable information or combination of information, to the server 104. With this information, the server 104 can authenticate the events reported from the mobile device 112 by comparing against the data sent from the tracking device 106.

In some embodiments, when the bi-directional connection is established between the mobile device 112 and the tracking device 106, the tracking device 106 has the user information. The tracking device 106 and/or the mobile device 112 can send the exercise activity information and the user information to the server 104.

In some embodiments, if the tracking device 106 is battery-operated, the tracking device 106 can send battery information, such as a brownout event, to the gateway of the server 104, so that gym operators can be timely informed to replace the battery of the tracking device.

In some embodiments, regardless the exercise device is used or not, the tracking device 106 can periodically report its run-time status and statistics to the gateway, for book-keeping and diagnosis purpose of the tracking device 106 and/or the exercise device.

In some embodiments, the tracking device 106 can receive commands from the gateway, such as flashing an LED to identify itself, so that a gym operator can easily identify the tracking device 106.

In some embodiments, the server 104 may provide a front-end user interface (UI), such as a website, a dedicated PC, or a mobile application, for gym operators and/or trainers to access the users exercise activities, so that proper guidance, advice, and/or training can be provided to the users. In some embodiments, a user interface on mobile and/or web interface can also be provided to users on mobile devices, for the purpose to monitor and track their exercise activities, as described above.

In some embodiments, a user's detailed exercise information is collected and stored in the server 104. The information includes, but not limited to, start/end time and date, equipment type, duration, sets and repeats (for pin-loaded equipment, workbenches, and power racks), break intervals in all sessions recorded by the mobile device 112 and/or the tracking device 106 associated with exercise device. The data can be organized and displayed in many ways through the front-end user interface (UI).

Figure 4:
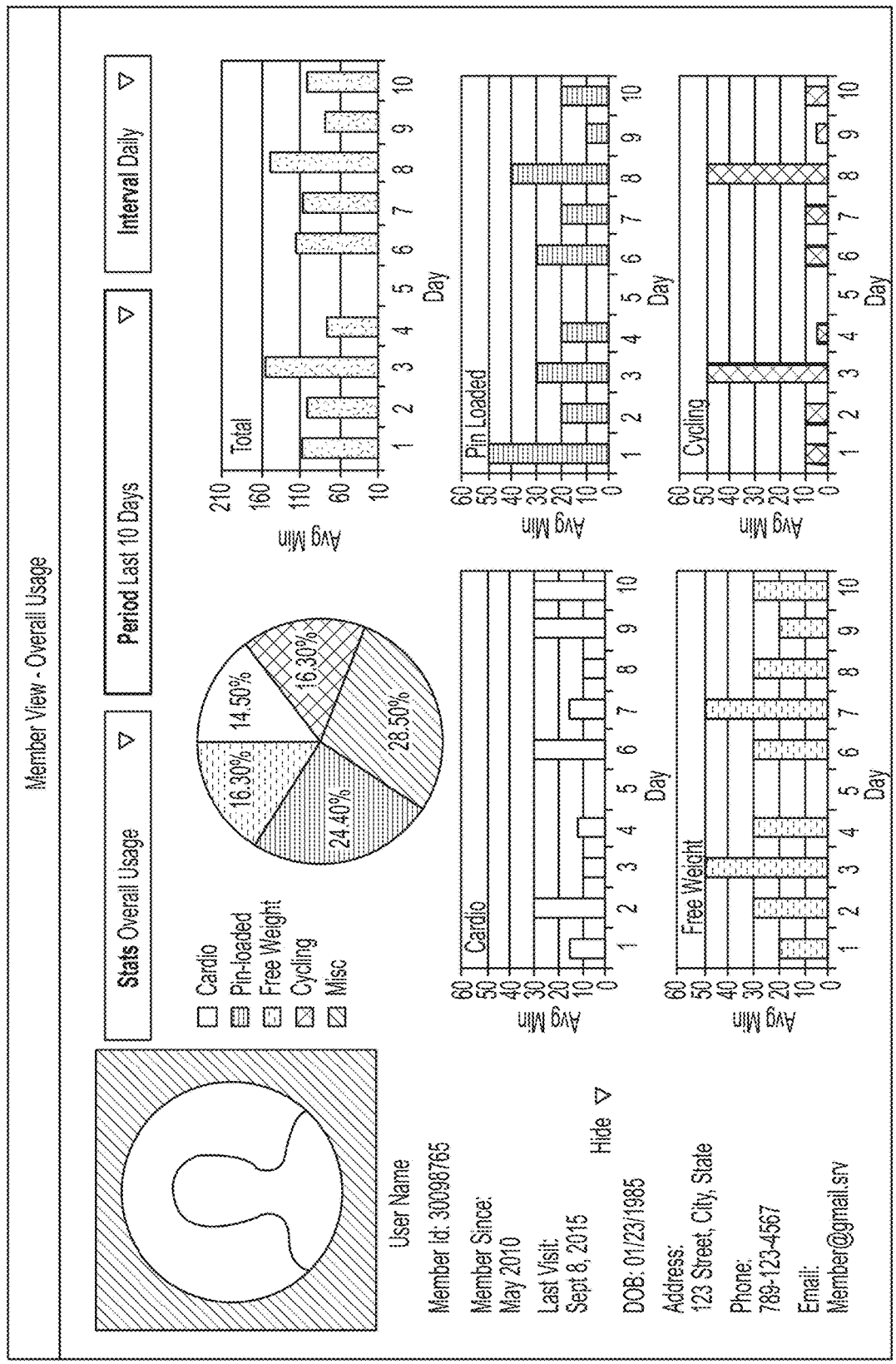
FIG. 4 illustrates an exemplary user interface according to certain embodiments of the present disclosure.

FIG. 4 illustrates an exemplary user interface displaying a user's overall gym exercise data in last 10 days according to certain embodiments of the present disclosure. In one tab or page of the mobile UI, the user's exercise summary in the last 10 days is displayed. The category of used equipment, durations of each, percentage of each type, are shown to the user.

In some embodiments, the aggregated data of all members collected through mobile devices can be combined to track the equipment usage, improve operation efficiency of gyms, and provide more insights to optimize members' exercise routines.

In some embodiments, the same type of equipment can be grouped together. For a certain group, its total number of visiting members, total number of visits, and total operation time can be compared against those of other groups. If one group has significantly more users than another group, the gym can look into the scenarios and decide which group or groups need to add or reduce number of equipment.

In some embodiments, individual equipment can be compared against others of the same type, particularly when they are physically close. If one specific exercise device always has less member accesses than others or no member accesses, the gym operators may be informed to check the device. This may indicate that the exercise device has certain issues, such as a defect, being close to an environment that is not user-friendly, or something else that needs the gym operators' attention.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. For example, the environment 100 can be also applied to settings that do not involve gym or exercise devices. For example, the environment 100 can be applied to recognize an employee that is using device B in factory A owned by company C. Instead of comparing that employee with all employees of company C, a face recognition process can only compare the employee with other employees that are currently inside factory A. Additionally or alternatively, a face recognition process can only compare the employee with employees that are using devices other than device B in factory A. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A method for recognizing a face of a user that uses a device in a facility, comprising:
   receiving a photo or a video clip of the user, wherein the photo or the video clip is taken at a point in time of the user using a first device;
   extracting a face image of the user from the photo or the video clip of the user;
   receiving a candidate list comprising a first list of users that are within the facility;
   generating a candidate face set by including at least one or more candidate faces corresponding to one or more users that are included in the first list of users; and
   determining whether the face image corresponds to a user in the candidate list, wherein the first list of users is further reduced by (1) receiving a second list of users, wherein the second list of users are using other devices in the facility that are different from the first device, and (2) excluding one of more users that are included in the second list of users from the first list of users.

2. The method of claim 1, wherein the candidate face set is generated by excluding the one or more candidate faces corresponding to users that are not included in the first list of users from a full candidate face set of all users of the facility.

3. The method of claim 1, wherein the one or more candidate faces of the users in the candidate face set are acquired at a registration system.

4. The method of claim 1, wherein the extraction of the face image of the user from the photo or the video clip of the user is executed by a local computer.

5. The method of claim 1, wherein the determination of whether the face image corresponds to a candidate's face of the candidate face set is performed by a computing cloud.

6. A system for recognizing a face of a user that uses a device in a facility, comprising:
a camera operable to capture a photo or a video of the user, wherein the photo or a video clip is taken at a point in time of the user using a first device;
a memory that stores a module; and
a processor, coupled, locally or remotely, to the camera, configured to run the module stored in the memory that is configured to cause the processor to:
receive a candidate list comprising a first list of users that are within the facility,
generate a candidate face set by including at least one or more candidate faces corresponding to one or more users that are included in the first list of users, and
determine whether face image corresponds to a user in the candidate list,
wherein the first list of users is further reduced by (1) receiving a second list of users, wherein the second list of users are using other devices in the facility that are different from the first device, and (2) excluding one of more users that are included in the second list of users from the first list of users.

7. The system of claim 6, wherein the candidate face set is generated by excluding the one or more candidate faces corresponding to users that are not included in the first list of users from a full candidate face set of all users of the facility.

8. The system of claim 6, wherein the one or more candidate faces of the users in the candidate face set are acquired at a registration system.

9. The system of claim 6, wherein the processor is located remote from the facility.

10. The system of claim 6, wherein the processor is located within the facility.

11. The system of claim 6, wherein the processor is located inside the camera.

12. A non-transitory computer readable medium having executable instructions operable to cause an apparatus to:
receive face image of a user extracted from a photo or a video clip of the user, wherein the photo or the video clip is taken at a point in time of the user using a first device;
receive a candidate list comprising a first list of users that are within a facility;
generate a candidate face set by including at least one or more candidate faces in the first list of users; and
determine whether the face image corresponds to the user in the candidate list,
wherein the first list of users is further reduced by (1) receiving a second list of users, wherein the second list of users are using other devices in the facility that are different from the first device, and (2) excluding one of more users that are included in the second list of users from the first list of users.

13. The non-transitory computer readable medium of claim 12, wherein a reduced face set is generated by excluding the at least one or more candidate faces corresponding to users that are not included in a full candidate face set of all users of the facility.

14. The non-transitory computer readable medium of claim 12, wherein the at least one or more candidate faces of the users in the candidate face set are acquired at a registration system.

15. The non-transitory computer readable medium of claim 12, wherein the non-transitory computer readable medium is located remote from the facility.

16. The non-transitory computer readable medium of claim 12, wherein the non-transitory computer readable medium is located within the facility.

17. The non-transitory computer readable medium of claim 12, wherein the non-transitory computer readable medium is located inside a camera.

18. The system of claim 6, wherein the module comprises software.

* * * * *